United States Patent
Siddiqui et al.

(10) Patent No.: US 6,626,706 B2
(45) Date of Patent: Sep. 30, 2003

(54) EIGHT-PIN ELECTRICAL CONNECTOR AND USB CONNECTOR

(75) Inventors: Kabir Siddiqui, Sammamish, WA (US); Jeremy Jacobson, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/072,753

(22) Filed: Feb. 8, 2002

(65) Prior Publication Data

US 2003/0153213 A1 Aug. 14, 2003

(51) Int. Cl.$^7$ ............................................. H01R 24/04
(52) U.S. Cl. ................................................... 439/668
(58) Field of Search ......................... 439/668, 669; 381/187, 72

(56) References Cited

U.S. PATENT DOCUMENTS

| | | | | |
|---|---|---|---|---|
| 4,972,491 A | * | 11/1990 | Wilcox, Jr. | 439/669 |
| 5,118,309 A | * | 6/1992 | Ford | 439/620 |
| 6,149,469 A | * | 11/2000 | Kim | 439/668 |
| 6,203,344 B1 | * | 3/2001 | Ito | 439/669 |
| 6,337,444 B1 | * | 1/2002 | Lioa | 439/501 |
| 6,394,852 B1 | * | 5/2002 | Huang | 439/669 |
| 6,425,783 B1 | * | 7/2002 | Touboul | 439/669 |

\* cited by examiner

*Primary Examiner*—Renee Luebke
*Assistant Examiner*—Briggitte R. Hammond
(74) *Attorney, Agent, or Firm*—Merchant & Gould, LLC (57) ABSTRACT

An electrical connector and a USB connector are provided. The electrical connector includes a main connector housing having an upper pin housing and a lower pin housing. A stereo plug that protrudes from a front surface of the main connector housing lies between the inner surface of the lower pin housing and the inner surface of the upper pin housing. The electrical connector is adapted to connect to a jack. The upper pin housing and the lower pin housing are adapted to connectively engage a forward plug port housing of the jack. The jack is mounted within the casing of an electronic device such as a hand-held personal computer, a personal digital assistant, a wireless telephone, or a paging device. When the electrical connector is connected to the jack, the upper pin housing is inserted into an upper housing receiving port and the lower pin housing is inserted into a lower housing receiving port so that the electrical connector is mated to the casing of the electronic device. The improved USB connector includes a connector body, a USB connector plug, an alignment post and electrical power contacts on each side of the alignment post. A locking latch may be disposed along an upper surface of the alignment post for engaging a locking latch detent disposed in an interior upper surface of the alignment post port.

31 Claims, 7 Drawing Sheets

Fig. 1

PRIOR ART

EIGHT-PIN ELECTRICAL CONNECTOR AND USB CONNECTOR

FIELD OF THE INVENTION

This invention relates to electrical connectors adapted to connect to a jack for use with electronic devices, and more particularly, relates to an improved eight-pin connector for use with electronic devices.

BACKGROUND OF THE INVENTION

Electronic devices such as wireless telephones, hand-held computers and personal digital assistants use a variety of power/data/audio connector/jack combinations for transferring power, data and other electrical signals to and from the electronic devices. For example, electronic devices equipped for audio input/output include an audio output jack for receipt of an audio connector for presenting audio output to a user. Prior art audio output connectors often include a four-pin stereo plug that can mate with and accept signals from standard four-pin stereo contacts and an additional four-pin plug arranged adjacent to the four-pin stereo plug for additional electrical connectivity. The physical size associated with such prior art connectors becomes relatively large compared to modern electronic devices that are very small and lightweight. Consequently, the audio plug becomes obtrusive and cumbersome, and often contact between the connector and the electronic device is difficult to maintain.

Additionally, modern electronic devices, such as personal digital assistants, include jacks for other types of connectors, such as power connectors and universal serial bus (USB) connectors. Prior art systems include a USB connector for mating to a USB jack and a separate power connector for mating to a power jack. As is often the case, a user of a personal digital assistant may have a number of connectors attached to the personal digital assistant at any given time. That is, the user may have an electrical connector for providing audio signals to a speaker device, the user may have a USB connector connected to the personal digital assistant for transferring data to and from the personal digital assistant, and the user may have a power connector connected to the PDA for providing electrical power. The problem with this arrangement is that the mass of the various cords and connectors attached to the personal digital assistant often overwhelm the mass of the personal digital assistant and thus places strain on the various connectors and jacks which may cause damage to the connectors and jacks and which may make use of the personal digital assistant cumbersome.

It is with respect to these and other considerations that the present invention has been made.

SUMMARY OF THE INVENTION

In accordance with the present invention, the above and other problems are solved by an improved electrical connector and an improved USB connector.

According to one aspect of the present invention, an improved electrical connector includes a main connector housing having an upper pin housing and a lower pin housing. The upper pin housing has an outer surface and an inner surface where the outer surface forms a continuous surface with the surface of the main connector housing. The upper housing has a pair of electrical contact pins disposed along the inner surface of the upper housing.

The lower pin housing is disposed in spaced-apart relation to the upper pin housing, and the lower pin housing has an outer surface and an inner surface, where the outer surface forms a continuous surface with the surface of the main connector housing. The inner surface of the lower pin housing faces the inner surface of the upper pin housing. The lower pin housing has a pair of electrical contact pins disposed along the inner surface of the lower pin housing. The electrical connector of the present invention also includes a stereo plug that protrudes from a front surface of the main connector housing between the inner surface of the lower pin housing and the inner surface of the upper pin housing.

The electrical connector is adapted to connect to a jack. The stereo plug of the electrical connector is adapted to connectively insert into a plug port of the jack. The upper pin housing and the lower pin housing are adapted to connectively engage a forward plug port housing of the jack.

The stereo plug includes a plurality of electrical contact pins for engaging a corresponding plurality of electrical contacts disposed along an interior surface of the plug port of the jack. The pair of electrical contact pins of the upper housing engage a corresponding pair of electrical contacts disposed along an upper surface of the forward section of the plugged port housing of the jack. The pair of electrical contact pins of the lower housing likewise engages a corresponding pair of electrical contacts disposed along the lower surface of the forward section of the plug port housing.

The stereo plug has a plurality of contact pins. The contact pins of the stereo plug may include a microphone contact, a right speaker contact, a left speaker contact, and an analog ground contact. The pair of electrical contact pins of the upper housing may include a clock contact pin and a digital ground pin. The pair of electrical contact pins of the lower housing may include a data pin and a power pin.

The jack of the present invention is mounted within the casing of an electronic device such as a hand-held personal computer, a personal digital assistant, a wireless telephone, or a paging device. A face surface of the forward section of the jack is flush with an exterior surface of the casing of the electronic device. An upper housing receiving port is defined in the casing immediately above the upper surface of the forward section of the jack. A lower housing receiving port is defined in the casing immediately below the lower surface of the forward section of the jack. When the electrical connector is connected to the jack, the upper pin housing is inserted into the upper housing receiving port and the lower pin housing is inserted into the lower housing receiving port so that the electrical connector is mated to the casing of the electronic device.

According to another aspect of the present invention, an improved USB connector includes a connector body, a USB connector plug, and an alignment post. The USB connector plug is defined along a first end of the connector body and protrudes perpendicularly from a front face of the connector body. The alignment post is defined adjacent to the USB connector plug in spaced-apart relation to the USB connector plug and protrudes perpendicularly from the front face of the connector body. The USB connector also includes a pair of electrical contacts defined on the face of the connector body. A first electrical power contact of the pair of electrical contacts is disposed adjacent to a first side of the alignment post, and a second electrical contact of the pair of contacts is disposed on the face of the connector body immediately adjacent to a second side of the alignment post.

The USB connector plug is adapted for connectively inserting into a mating plug port of a USB jack. The alignment post is adapted to connectively insert into a corresponding alignment post port of the USB jack. The first and second electrical power contacts are adapted to engage corresponding first and second electrical power input contacts defined adjacent to first and second sides of the alignment post port of the USB jack.

The alignment post includes an alignment post guide member that is disposed along the first side of the alignment post for guiding the alignment post into the alignment post port. The alignment post has a greater length than the USB connector plug so that the alignment post inserts into the alignment post port prior to insertion of the USB connector plug into the USB connector plug port to insure that the USB connector plug is in a proper orientation when it is inserted into the USB connector plug port. A locking latch may be disposed along an upper surface of the alignment post for engaging a locking latch detent disposed in an interior upper surface of the alignment post port for securing the USB connector to the USB connector jack.

These and other features which characterize the present invention will be apparent from a reading of the following detailed description and a review of the associated drawings. It is to be understood that both the foregoing general description and the following detailed description are exemplary and explanatory only, and are not restrictive of the invention, as claimed.

DETAILED DESCRIPTION

The following description of embodiments of the present invention is made with reference to the above-described drawings wherein like numerals refer to like parts or components throughout the several figures. The present invention is directed to an improved eight-pin electrical connector and to an improved USB connector that includes an integrated power connector so that a separate power cord is not required.

Figure 1:
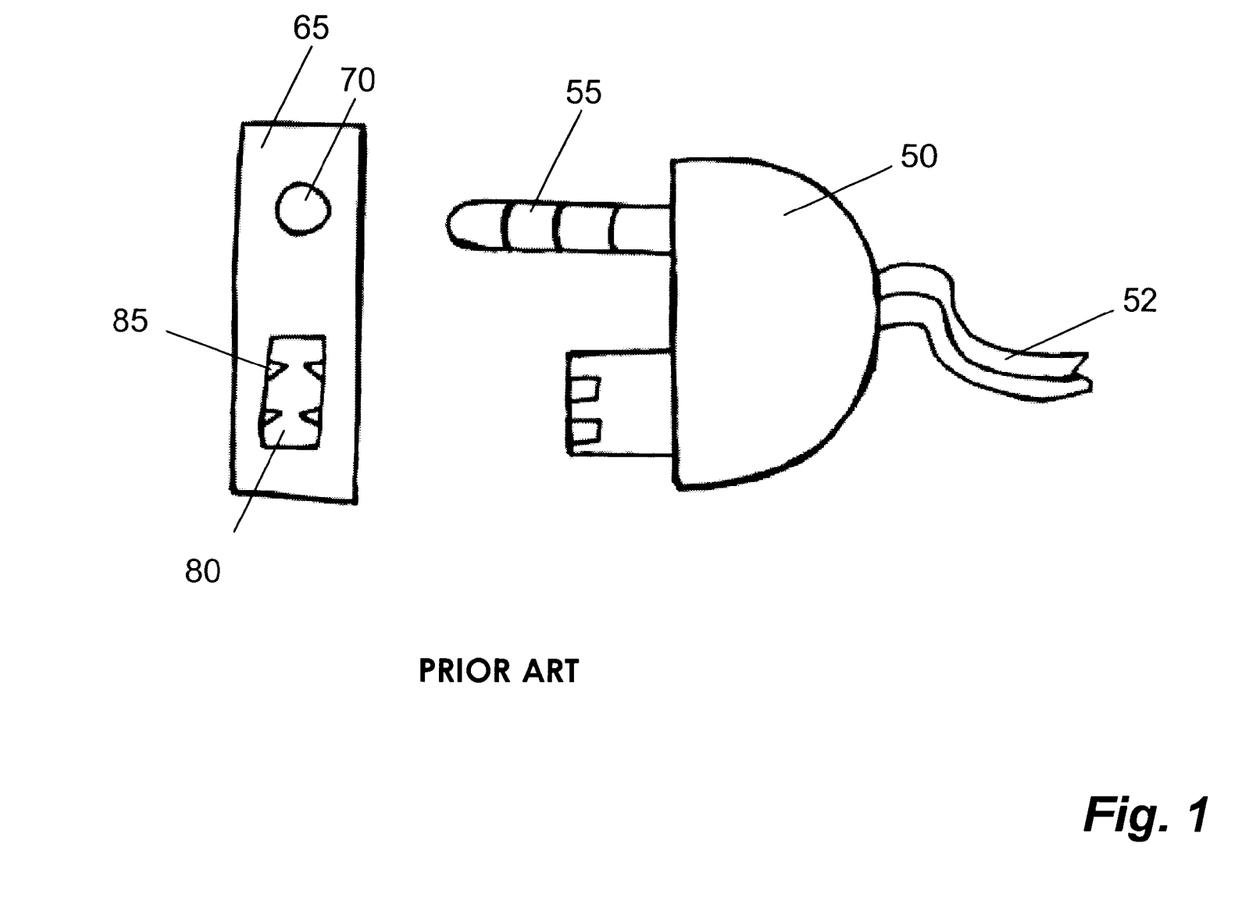
FIG. 1 is a side elevation view of an illustrative prior art eight-pin audio connector and corresponding jack.

FIG. 1 is a side elevation view of an illustrative prior art eight-pin audio connector and corresponding jack. The illustrative prior art eight-pin audio connector 50 illustrated in FIG. 1 is adapted to mate with a jack 65. The prior art connector 50 includes a four-pin stereo plug 55 and an additional four-pin plug 60 for additional electrical connectivity. The four-pin stereo plug 55 is adapted to mate with the jack port 70 and the four-pin plug 60 is adapted to mate with the jack port 80 and contacts 85. A cord 52 is adapted to the rear section of the prior art connector 50. When the prior art connector 50 is mated with the prior art jack 65, forces placed on the connection by the weight of the connector 50 and cord 52 often place extensive strain on the electrical connections between the plugs 55, 60 and the corresponding jack ports 70, 80. Over time, the connections become worn and electrical connectivity may be disrupted or lost. Additionally, due to the size of the prior art connector 50 compared to modern small and lightweight electronic devices, such as wireless telephones and personal digital assistants, the weight and size of the connector and cord may overwhelm the weight and size of the electronic device to which they are connected to add further stress on the connections between the prior art connector 50 and an electronic device to which it is connected.

Figure 2:
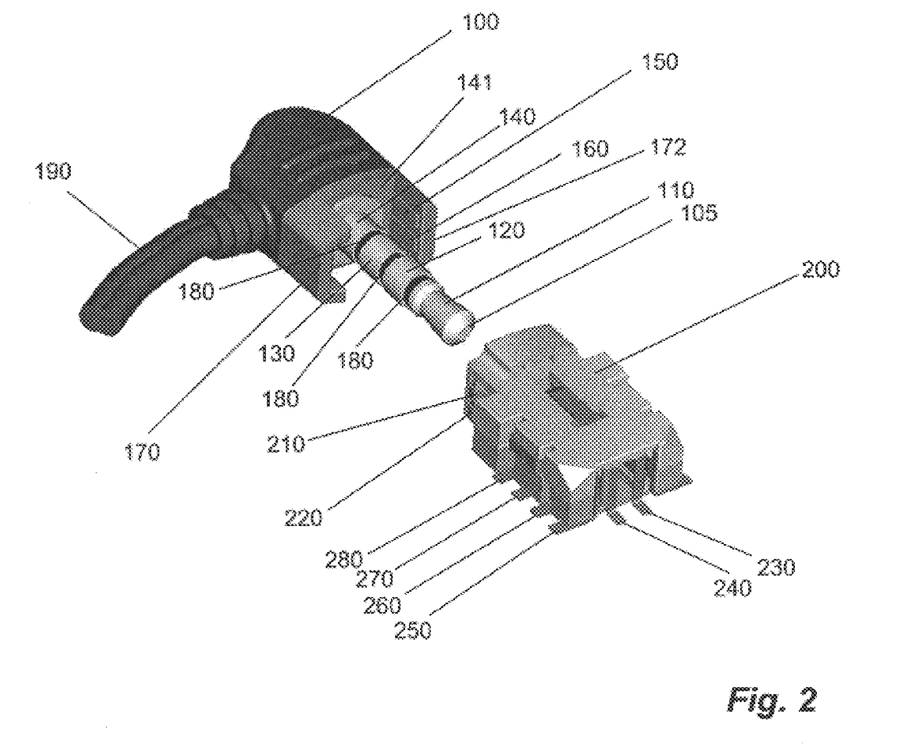
FIG. 2 is a perspective view of an eight-pin electrical connector and jack according to an embodiment of the present invention.

FIG. 2 is a perspective view of an eight-pin electrical connector and jack according to an embodiment of the present invention. As shown in FIG. 2, an improved eight-pin electrical connector 100 is adapted for mating with a jack 200. The eight-pin electrical connector 100 includes a cord 190 disposed along an upper surface of the eight-pin electrical connector 100. As should be understood by those skilled in the art, the cord 190 may be placed along other surfaces or sides of the eight-pin electrical connector 100 as desired. Protruding from a front side of the eight-pin electrical connector 100 is a four-pin stereo plug 105. Description of the connector 100 for use in audio connections is by way of example only and is not limiting of the types of connections for which the connector 100 may be used. The connector 100 of the present invention may be used as a vehicle for a variety of connection pins to corresponding contacts of a mating jack. For example, the connector 100 may be used to transfer data to and from an electronic device via a connection between the connector and a mating jack such as the jack 200 described below.

Figure 3:
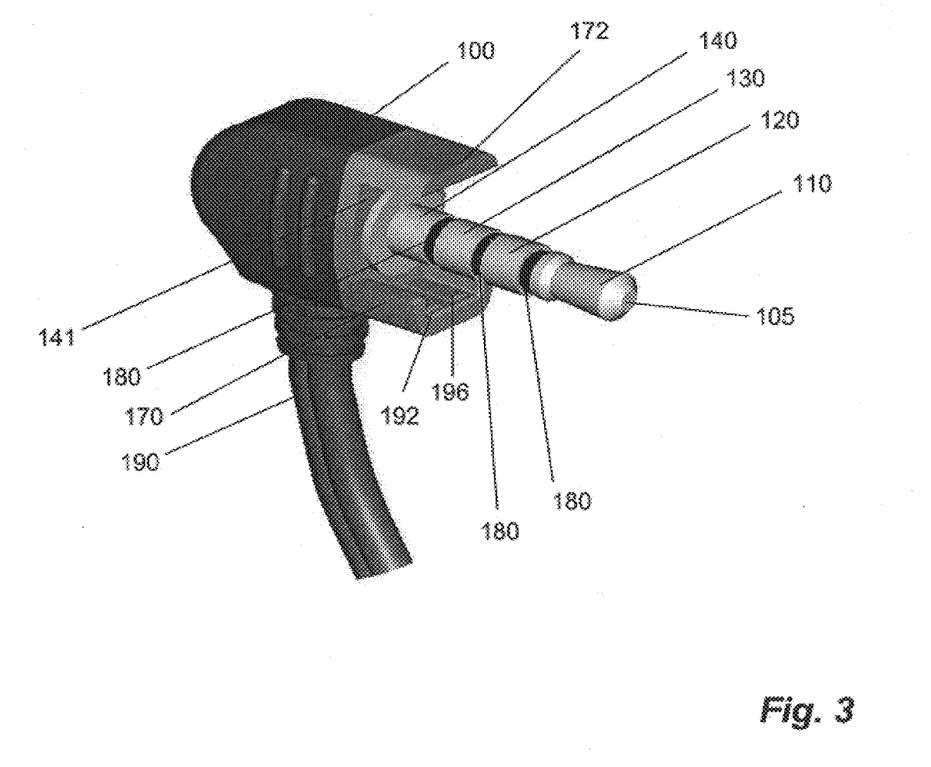
FIG. 3 is a perspective pictorial view of an eight-pin electrical connector according to an embodiment of the present invention.
Figure 4:
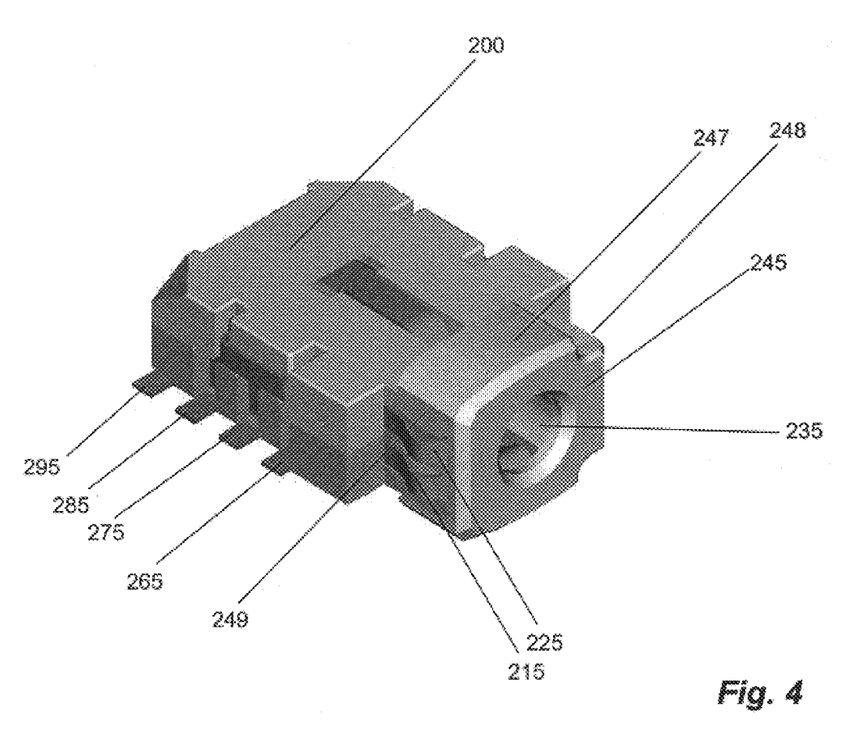
FIG. 4 is a perspective pictorial view of a jack according to an embodiment of the present invention.

According to the exemplary audio connector illustrated in FIGS. 2–4, the four-pin stereo plug 105 may include a microphone contact 110, a right speaker contact 120, a left speaker contact 130, and an analog ground contact 140. Disposed between the contacts 110, 120, 130 and 140 are a plurality of insulators 180. As set forth above the contacts 110, 120, 130 and 140 may be used for a variety of other types of electrical and data connectivity.

Above and below the four-pin stereo plug 105 are an upper pin housing 170 and a lower pin housing 172, respectively. As shown in FIG. 2, the lower pin housing 172 includes a pair of additional electrical pins, for example, a data pin 150 and a power pin 160. Referring to FIG. 3, for a different view of the eight-pin electrical connector 100, the upper pin housing 170 includes additional electrical pins, for example, a clock pin 192 and a digital ground pin 196.

Figure 5:
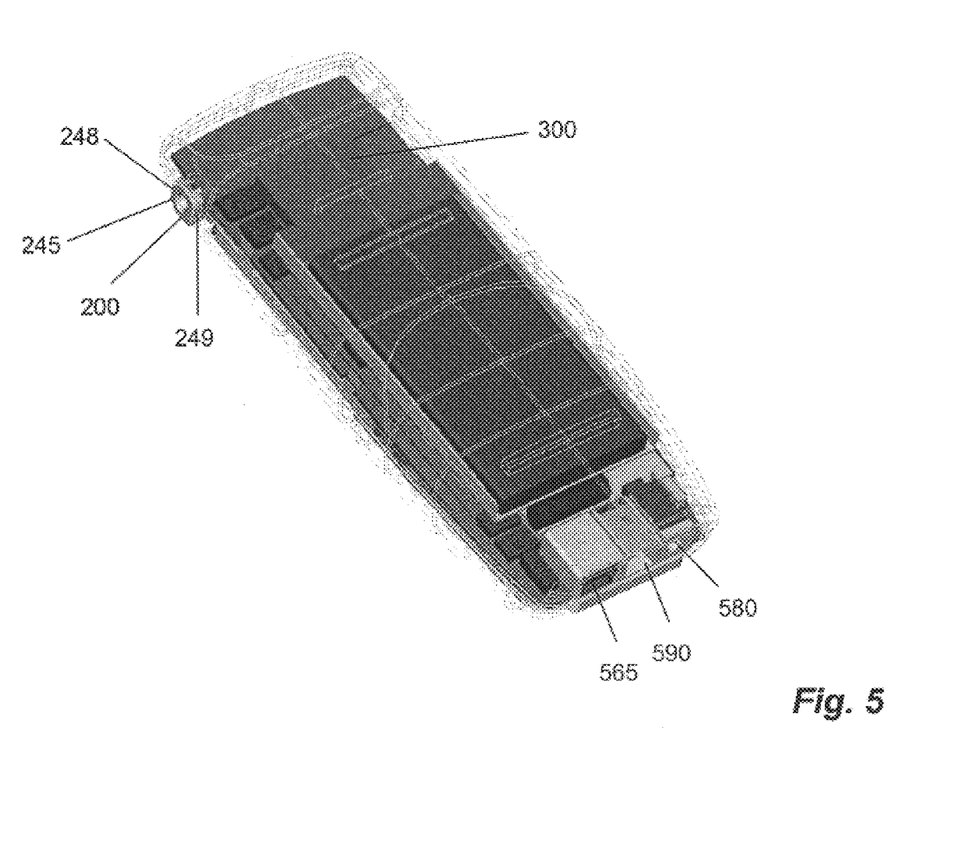
FIG. 5 is a perspective pictorial view of a personal digital assistant showing an exterior case of the personal digital assistant in phantom and illustrating a jack and mini-USB connector of the present invention.

A jack 200 according to an embodiment of the present invention is illustrated in FIGS. 2, 4 and 5. The jack 200 includes a number of contacts for establishing electrical connectivity with the pins of the eight-pin electrical connector 100. As described above with reference to the connector 100, the contacts of the jack may be used for a variety of electrical or data connections with the connector 100. By way of example, as shown in FIG. 2, a pendant bus clock contact 210 and a pendant bus ground contact 220 are disposed along an outer surface of the forward end of the jack 200 for electrically mating with the contacts 192 and 196 of the eight-pin electrical connector 100. Additional contacts may include a microphone input contact 230, a speaker pass-through contact 240, a right speaker contact 250, a pendant bus clock contact 260, an analog ground for audio signals contact 270, and a pendant bus ground contact 280.

FIG. 4 is a perspective pictorial view of a jack according to an embodiment of the present invention. A number of other contacts are disposed along the other side of the jack 200 and may include, for example, a pendant bus power contact 215 and a pendant bus ground contact 225 for electrically connecting the pins 150 and 160 of the connector 100, illustrated in FIG. 2. Additional contacts of the jack 200 may include a pendant bus power contact 265, a left speaker contact 275, a pendant bus open collector data contact 285, and a microphone pass-through contact 295. Electrical connectivity between the pins of the eight-pin electrical connector 100 and the contact of the jack 200, and operation thereof, is well known to those skilled in the art.

FIG. 5 is a perspective pictorial view of a personal digital assistant showing an exterior case of the personal digital assistant in phantom and illustrating a jack 200 of the present invention integrated with the personal digital assistant 300. The jack 200 is integrated with the personal digital assistant (PDA) 300 such that the front face 245 of the jack 200 is flush with the outer surface of the casing (shown in phantom) of the PDA 300. An upper housing receiving port is adapted into the casing of the PDA 300 directly above the upper edge 248. A lower housing receiving port is adapted directly below the lower edge 249 of the jack 200. The receiving ports allow for insertion of the upper and lower pin housings 170, 172 of the eight-pin electrical connector 100, illustrated below with reference to FIG. 6.

Referring now to FIGS. 2, 3, 5 and 6, the eight-pin electrical connector 100 is adapted for mating with the jack 200 so that the four-pin plug 105 is inserted into the entry port 235 of the jack 200 until the rear surface 141 comes into snug contact with the front face 245 of the jack 200. When the eight-pin electrical connector 100 is connected to the jack 200, the upper contact housing 170 slides over the upper edge 248 of the forward section 247 of the jack 200. The lower contact housing 172 slides over the lower edge 249 of the forward section 247 of the jack 200. Thus, the pins 192 and 196 of the upper contact housing 170 engage the electrical contacts 210 and 220 of the jack 200, and the pins 150 and 160 of the lower contact housing 172 of the eight-pin electrical connector 100 engage the contacts 215 and 225 of the lower edge 249 of the forward section 247 of the jack 200.

Referring to FIG. 5, when the eight-pin electrical connector 100 is connected to the jack 200, as described, the upper and lower contact housings 170, 172 are inserted into the receiving ports integrated within the casing of the PDA 300 in order for the pins 150, 160, 192, 196 to engage the corresponding contacts of the jack 200. Advantageously, insertion of the upper and lower pin housings 170, 172 into the casing of the PDA 300 in order to achieve electrical contact between all pins of the eight-pin electrical connector 100 with corresponding contacts of the jack 200 creates a secure fit between the eight-pin electrical connector 100 and the jack 200 and corresponding electronic device (for example, the PDA 300) in which the jack 200 is integrated.

Figure 6:
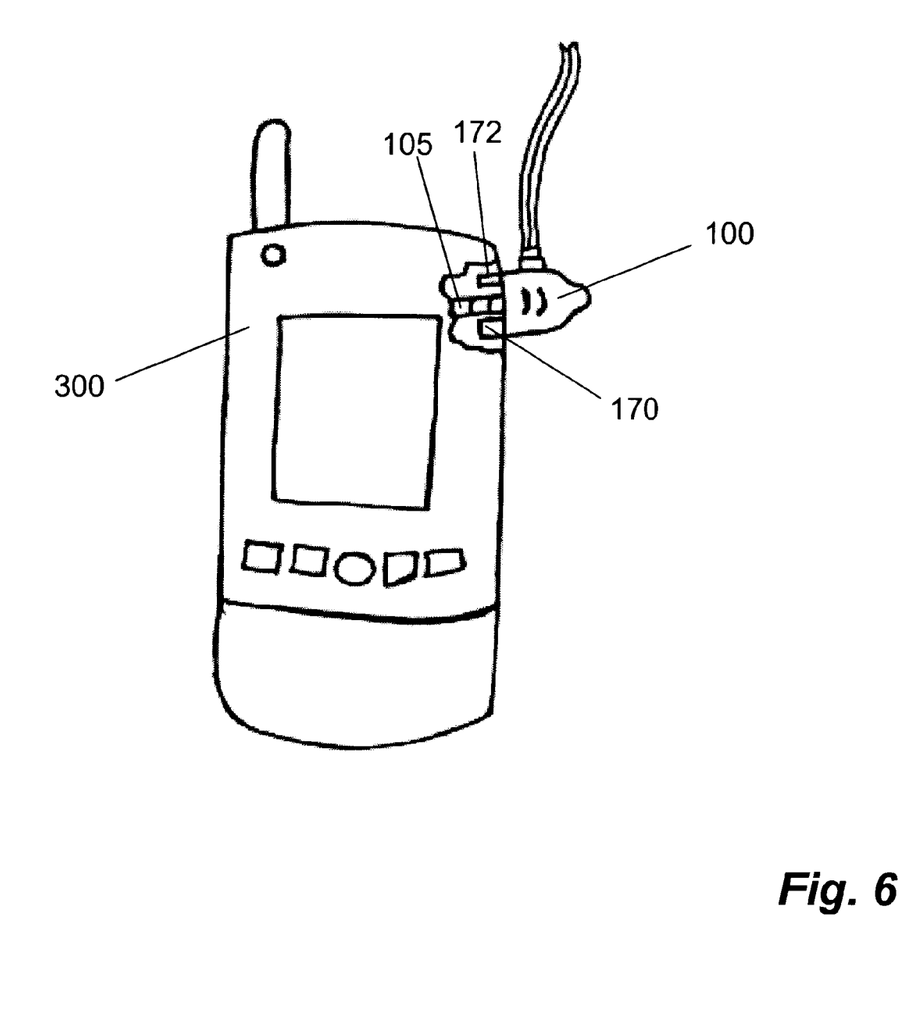
FIG. 6 is a top-plan view of a personal digital assistant showing an eight-pin electrical connector according to an embodiment of the present invention.

The illustration in FIG. 6 shows a cutaway section of the PDA 300 for illustration of the insertion of the four-pin plug 105 and the upper and lower pin housings 170 and 172 into the PDA 300 (jack 200 not illustrated in FIG. 6). The upper and lower pin housings 170 are inserted into the interior of the PDA 300 so that the eight-pin electrical connector 100 achieves a secure connection with the jack 200 integrated interior of the PDA 300. In contrast to the prior art connector 50 illustrated in FIG. 1, stresses placed on the eight-pin electrical connector 100 from contact with foreign objects or from the mass of the eight-pin electrical connector 100 and cord 190 relative to the PDA 300 place very little stress on the electrical connections between the pins of the eight-pin electrical connector 100 and the contacts of the jack 200. Insertion of the upper and lower pin housings 170 and 172 into the casing of the PDA 300 insures that vibration and stresses acting on the connection between the eight-pin electrical connector 100 and the jack 200 are not directed to the electrical contacts, but instead are directed to the housing of the eight-pin electrical connector 100 and the casing of the PDA 300 which are stronger and less likely to be damaged by the introduction of stresses applied to those components.

Additionally, by placing the additional four-pin contacts of the connector 100 inside the upper and lower housings 170, 172, the overall size and shape of the eight-pin electrical connector 100 is minimized relative to prior art connectors, such as the connector illustrated in FIG. 1. As illustrated in FIG. 6, the cord 190 is disposed along the upper surface of the eight-pin electrical connector 100. This orientation is advantageous if the electronic device 300 is a personal digital assistant, wireless telephone, or other audio output device that may be carried in a shirt pocket or connected to a belt or other location, where an upward orientation of the cord 190 reduces additional strain on the connection between the eight-pin electrical connector 100 and the jack 200 integrated into the device 300.

Figure 7:
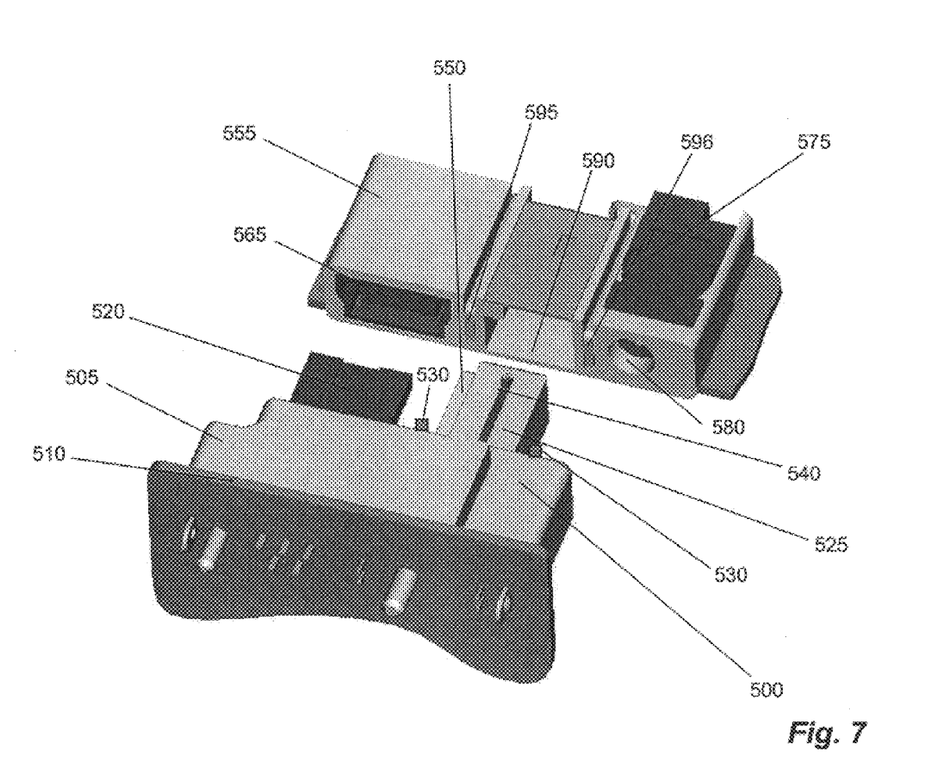
FIG. 7 is a pictorial perspective view of a mini-USB connector plug and a mini-USB connector jack according to an embodiment of the present invention.

FIG. 7 is a pictorial perspective view of a mini-USB connector plug and a mini-USB connector jack according to an embodiment of the present invention. The USB connector plug 500 illustrated in FIG. 7 includes a printed circuit board 510 connected to a plug main body 505. Along a front surface of the plug main body 505 is a mini-USB connector plug 520 for passing data to and from an electronic device, such as a personal digital assistant 300. Adjacent to the USB connector plug 500 is an alignment post 525. Disposed on an upper surface of the alignment post 525 is a locking latch 540. An alignment post guide 550 is defined along an inner side of the alignment post 525 for guiding the alignment post 525 into an alignment post port 590. On each side of the alignment post 525 is an electrical power contact 530.

Opposite the USB connector plug 500 is a USB jack 555. The USB jack 555 includes a USB connector plug port 565 for receipt of the USB connector plug 520 and an alignment post port 590 for receipt of the alignment post 525. A pair of electrical contacts 595 and 596 are defined along each side of the alignment post port 590 for engagement with the power contacts 530 defined along each side of the alignment post 525. Interior of the alignment post port 590 is a locking latch detent for engagement with the locking latch 540 when the USB connector plug 500 is connected to the USB jack 555. A separate power jack 575 with a power jack port 580 is disposed adjacent to the alignment post port 590 for connection of a separate electrical power contact to an electronic device in which the USB jack assembly 555 is integrated.

As illustrated in FIG. 7, the alignment post 525 has a greater length than the USB connector plug 520 so that the alignment post 525 engages the alignment post port 590 before the USB connector plug 520 engages the USB connector plug port 565. This configuration allows the alignment post 525 to place the USB connector plug 500 in a proper orientation before introduction of the connector plug 520 into the connector plug port 565. As is well known to those skilled in the art, small connector plugs, such as the mini-USB connector plug 520 are fragile and can become damaged if proper alignment of the connector plug to the connector plug port is not maintained during connection of the plug to the corresponding port.

Advantageously, use of the improved USB connector plug 500 of the present invention allows for the transfer of data via the connector plug, in addition to the transfer of electrical power, utilizing one USB connector plug 500, as illustrated in FIG. 7. Thus, the need to connect a separate power cord and plug to the power jack 575 is eliminated. Additionally, use of the alignment post 525 and locking latch 540 insures a secure connection between the connector plug and the corresponding jack.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. An improved electrical connector adapted to connect to a jack, comprising:
    a main connector housing having:
        an upper pin housing protruding from a front surface of the main connector housing, the upper pin housing having an outer surface and an inner surface, the outer surface of the upper pin housing forming a continuous surface with a surface of the main connector housing;
        the upper housing having a pair of electrical contact pins disposed on the inner surface of the upper housing;
        a lower pin housing protruding from the front surface of the main connector housing disposed in spaced-apart relation to the upper pin housing, the lower pin housing having an outer surface and an inner surface, the outer surface of the lower pin housing forming a continuous surface with a surface of the main connector housing, the inner surface of the lower pin housing facing the inner surface of the upper pin housing;
        the lower pin housing having a pair of electrical contact pins disposed on the inner surface of the lower pin housing; and
        a stereo plug protruding from the front surface of the main connector housing juxtaposed between the inner surface of the lower pin housing and the inner surface of the upper pin housing.

2. The electrical connector of claim 1 in combination with a jack mounted within a casing of an electronic device such that a face surface of a forward section of the jack is flush with an exterior surface of the casing of the electronic device; wherein the jack comprises:
    an upper housing receiving port in the casing immediately above an upper surface of the forward section of the jack; and
    a lower housing receiving port in the casing immediately below a lower surface of the forward section of the jack; and
    when the electrical connector is connected to the jack, the upper pin housing of the electrical connector is inserted into the upper housing receiving port of the jack and the lower pin housing of the electrical connector is inserted into the lower housing receiving port of the jack such that the electrical connector is mated to the casing of the electronic device.

3. The electrical connector of claim 1, wherein the stereo plug is adapted to connectively insert into a plug port of the jack, and wherein the upper pin housing and the lower pin housing are adapted to connectively engage a forward plug port housing of the jack.

4. The electrical connector of claim 3,
    whereby the stereo plug includes a plurality of electrical contact pins for engaging a corresponding plurality of electrical contacts disposed along an interior surface of the plug port of the jack.

5. The electrical connector of claim 4,
    whereby the plurality of electrical contact pins of the stereo plug comprise:
        a microphone contact;
        a right speaker contact;
        a left speaker contact; and
        an analog ground contact.

6. The electrical connector of claim 4,
    whereby the pair of electrical contact pins of the upper pin housing engage a corresponding pair of electrical contacts disposed along an upper surface of a forward section of the plug port housing of the jack.

7. The electrical connector of claim 6,
    whereby the pair of electrical contact pins of the upper housing includes:
        a clock contact pin; and
        a digital ground pin.

8. The electrical connector of claim 6,
    whereby the pair of electrical contact pins of the lower pin housing engage a corresponding pair of electrical contacts disposed along a lower surface of a forward section of the plug port housing of the jack.

9. The electrical connector of claim 8,
    whereby the pair of electrical contact pins of the lower housing includes:
        a data pin; and
        a power pin.

10. The electrical connector of claim 8, wherein the electrical connector is adapted to connect to a jack mounted within a casing of an electronic device.

11. The electrical connector of claim 10, whereby the electronic device is a hand-held personal computer.

12. The electrical connector of claim 10, whereby the electronic device is a hand-held personal digital assistant.

13. The electrical connector of claim 10, whereby the electronic device is a wireless telephone.

14. The electrical connector of claim 10, whereby the electronic device is a paging device.

15. An improved electrical connector adapted to connect to a jack, comprising:
    a main connector housing having:
        an upper pin housing protruding from a front surface of the main connector housing, the upper pin housing having an outer surface and an inner surface, the outer surface of the upper pin housing forming a continuous surface with a surface of the main connector housing;
        the upper housing having a pair of electrical contact pins disposed on the inner surface of the upper housing;
        a lower pin housing protruding from the front surface of the main connector housing disposed in spaced-apart relation to the upper pin housing, the lower pin housing having an outer surface and an inner surface, the outer surface of the lower pin housing forming a continuous surface with a surface of the main connector housing, the inner surface of the lower pin housing facing the inner surface of the upper pin housing;

the lower pin housing having a pair of electrical contact pins disposed on the inner surface of the lower pin housing; and a stereo plug protruding from the front surface of the main connector housing juxtaposed between the inner surface of the lower pin housing and the inner surface of the upper pin housing, the stereo plug having a plurality of electrical contact pins comprising a microphone contact, a right speaker contact, a left speaker contact, and an analog ground contact.

16. The electrical connector of claim 15, wherein the stereo plug is adapted to connectively insert into a plug port of the jack, and wherein the upper pin housing and the lower pin housing are adapted to connectively engage a forward plug port housing of the jack.

17. The electrical connector of claim 16, whereby the plurality of electrical contact pins of the stereo plug are adapted to engage a corresponding plurality of electrical contacts disposed along an interior surface of the plug port of the jack.

18. The electrical connector of claim 17, whereby the pair of electrical contact pins of the upper pin housing engage a corresponding pair of electrical contacts disposed along an upper surface of a forward section of the plug port housing of the jack.

19. The electrical connector of claim 18, whereby the pair of electrical contact pins of the lower pin housing engage a corresponding pair of electrical contacts disposed along a lower surface of a forward section of the plug port housing of the jack.

20. An improved electrical connector adapted to connect a jack, comprising:

a main connector housing having:
an upper pin housing protruding from a front surface of the main connector housing, the upper pin housing having an outer surface and an inner surface, the outer surface of the upper pin housing forming a continuous surface with a surface of the main connector housing;
the upper housing having a pair of electrical contact pins disposed on the inner surface of the upper housing, the pair of electrical contact pins including a clock contact pin and a digital ground pin;
a lower pin housing protruding from the front surface of the main connector housing disposed in spaced-apart relation to the upper pin housing, the lower pin housing having an outer surface and an inner surface, the outer surface of the lower pin housing forming a continuous surface with a surface of the main connector housing, the inner surface of the lower pin housing facing the inner surface of the upper pin housing;
the lower pin housing having a pair of electrical contact pins disposed on the inner surface of the lower pin housing; and
a stereo plug protruding from the front surface of the main connector housing juxtaposed between the inner surface of the lower pin housing and the inner surface of the upper pin housing.

21. The electrical connector of claim 20, wherein the stereo plug is adapted to connectively insert into a plug port of the jack, and wherein the upper pin housing and the lower pin housing are adapted to connectively engage a forward plug port housing of the jack.

22. The electrical connector of claim 21, whereby the stereo plug includes a plurality of electrical contact pins for engaging a corresponding plurality of electrical contacts disposed along an interior surface of the plug port of the jack.

23. The electrical connector of claim 22, whereby the pair of electrical contact pins of the upper pin housing engage a corresponding pair of electrical contacts disposed along an upper surface of a forward section of the plug port housing of the jack.

24. The electrical connector of claim 23, whereby the pair of electrical contact pins of the lower pin housing engage a corresponding pair of electrical contacts disposed along a lower surface of a forward section of the plug port housing of the jack.

25. An improved electrical connector connectable to a jack, comprising:

a main connector housing having:
an upper pin housing protruding from a front surface of the main connector housing, the upper pin housing having an outer surface and an inner surface, the outer surface of the upper pin housing forming a continuous surface with a surface of the main connector housing;
the upper housing having a pair of electrical contact pins disposed on the inner surface of the upper housing;
a lower pin housing protruding from the front surface of the main connector housing disposed in spaced-apart relation to the upper pin housing, the lower pin housing having an outer surface and an inner surface, the outer surface of the lower pin housing forming a continuous surface with a surface of the main connector housing, the inner surface of the lower pin housing facing the inner surface of the upper pin housing;
the lower pin housing having a pair of electrical contact pins disposed on the inner surface of the lower pin housing, the pair of electrical contact pins including a data pin and a power pin; and
a stereo plug protruding from the front surface of the main connector housing juxtaposed between the inner surface of the lower pin housing and the inner surface of the upper pin housing.

26. The electrical connector of claim 25, wherein the stereo plug is adapted to connectively insert into a plug port of the jack, and wherein the upper pin housing and the lower pin housing are adapted to connectively engage a forward plug port housing of the jack.

27. The electrical connector of claim 26, whereby the stereo plug includes a plurality of electrical contact pins for engaging a corresponding plurality of electrical contacts disposed along an interior surface of the plug port of the jack.

28. The electrical connector of claim 27, whereby the pair of electrical contact pins of the upper pin housing engage a corresponding pair of electrical contacts disposed along an upper surface of a forward section of the plug port housing of the jack.

29. The electrical connector of claim 28, whereby the pair of electrical contact pins of the lower pin housing engage a corresponding pair of electrical contacts disposed along a lower surface of a forward section of the plug port housing of the jack.

30. An improved electrical connector adapted to connect to a jack, wherein the electrical connector comprises:

an upper pin housing protruding from a front surface of a main connector housing, a lower pin housing protruding from the front surface of the main connector housing, and a stereo plug protruding from the front surface of the main connector housing, wherein the stereo plug is positioned between an inner surface of the upper pin housing and an inner surface of the lower pin housing, the inner surface of the upper pin housing facing the inner surface of the lower pin housing; and wherein the upper pin housing has a pair of electrical contact pins disposed on the inner surface of the upper housing, and the lower pin housing has a pair of electrical contact pins disposed on the inner surface of the lower pin housing.

31. The electrical connector of claim 30, wherein the stereo plug has a plurality of electrical contact pins along a length of the stereo plug.

* * * * *